United States Patent [19]
Knox

[11] Patent Number: 4,521,037
[45] Date of Patent: Jun. 4, 1985

[54] PIPE COUPLING

[76] Inventor: Granville S. Knox, 1323 Santa Margarita Dr., Fallbrook, Calif. 92028

[21] Appl. No.: 642,261

[22] Filed: Aug. 20, 1984

Related U.S. Application Data

[63] Continuation-in-part of Ser. No. 524,248, Aug. 18, 1983, abandoned.

[51] Int. Cl.³ .............................................. F16L 55/18
[52] U.S. Cl. ........................................ 285/15; 285/31; 285/423; 285/DIG. 16
[58] Field of Search ................... 285/DIG. 16, 31, 32, 285/423, 15

[56] References Cited

U.S. PATENT DOCUMENTS

| | | | |
|---|---|---|---|
| 3,826,521 | 7/1974 | Wilhelmsen | 285/423 X |
| 3,971,574 | 7/1976 | Curtin | 285/31 |
| 4,258,935 | 3/1981 | Rodrigo | 285/DIG. 16 |
| 4,281,856 | 8/1981 | Litman et al. | 285/DIG. 16 |

FOREIGN PATENT DOCUMENTS

| | | | |
|---|---|---|---|
| 534920 | 12/1956 | Canada | 285/31 |
| 5425 | 1/1978 | Japan | 285/31 |
| 51-79318 | 1/1978 | Japan | 285/31 |

Primary Examiner—Dave W. Arola
Attorney, Agent, or Firm—William W. Haefliger

[57] ABSTRACT

A coupling for joining two pipe sections having elongated outer surfaces and end terminals, comprises:

(a) a tubular extension fitted endwise between the pipe terminals to form joints therewith, (b) first and second collars telescopically movable axially of the tubular extension into coupling positions spanning the respective joints, (c) one collar having an axially elongated bore and counterbore, one of which has elongated slideable engagement with the outer surface of one end of the extension, and the other of which has elongated slideable engagement with the elongated outer surface of one pipe section, (d) the other collar having an axially elongated bore and counterbore, one of which has elongated slideable engagement with the outer surface of the other end of the extension, and the other of which has elongated slideable engagement with the elongated outer surface of the other pipe section, (e) and liquid bonding agent between the collar and said pipe sections and said extension to bond the collars to the extension and to the pipe sections, for sealing off therebetween.

9 Claims, 11 Drawing Figures

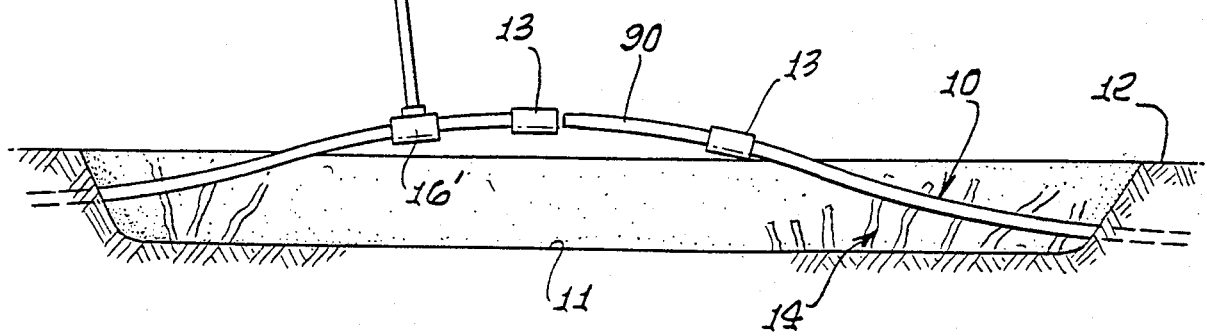
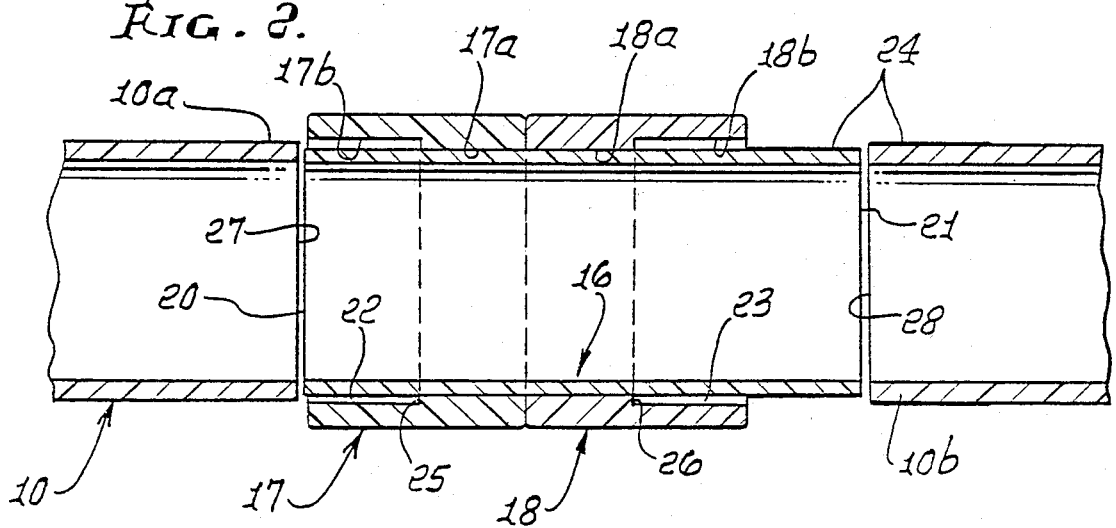
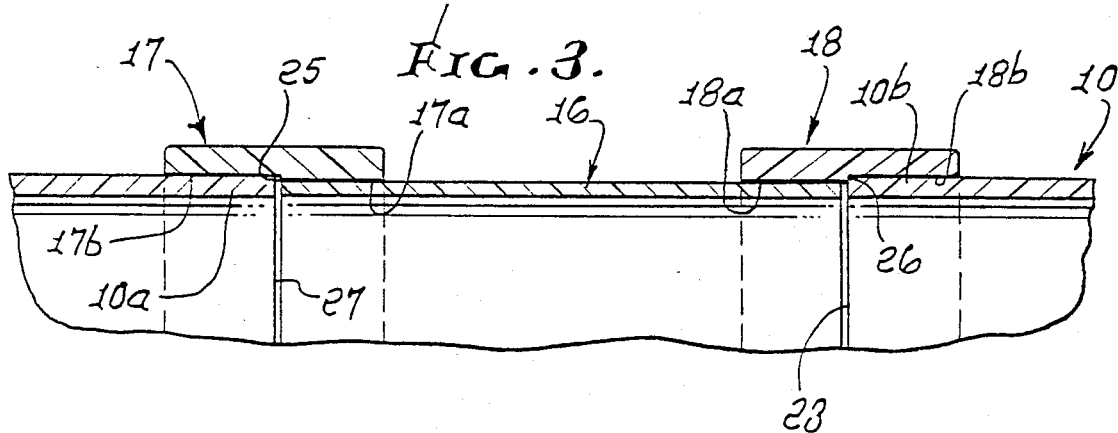

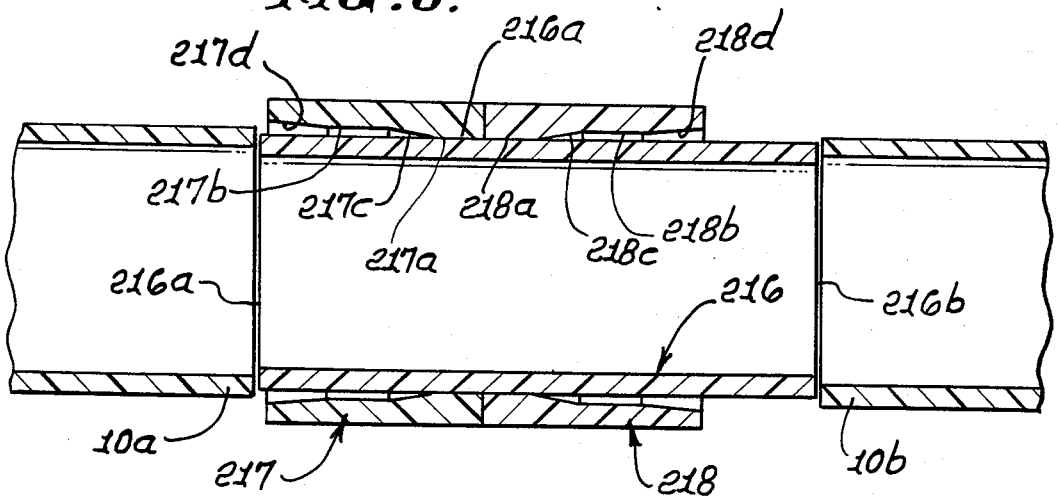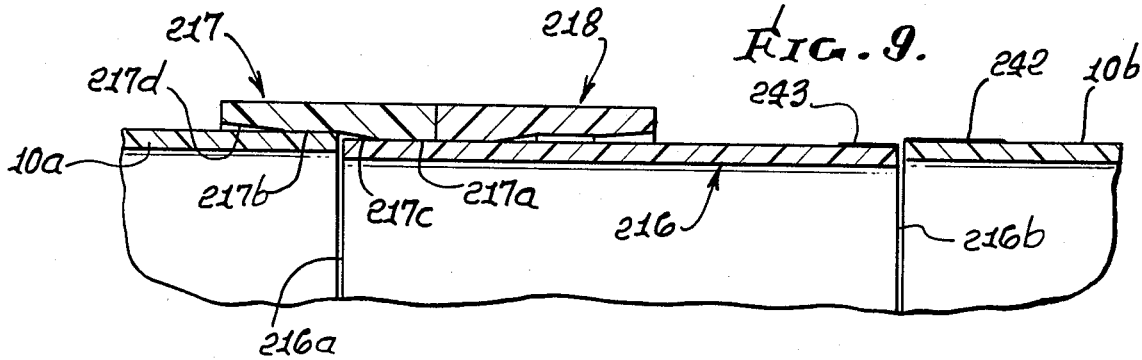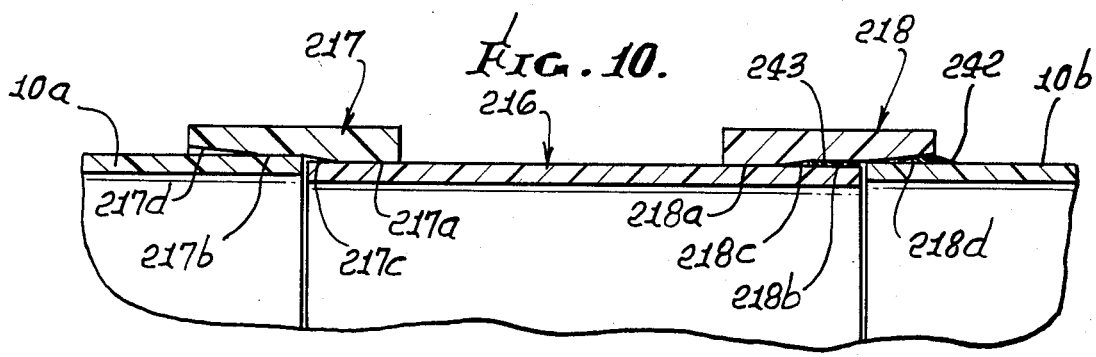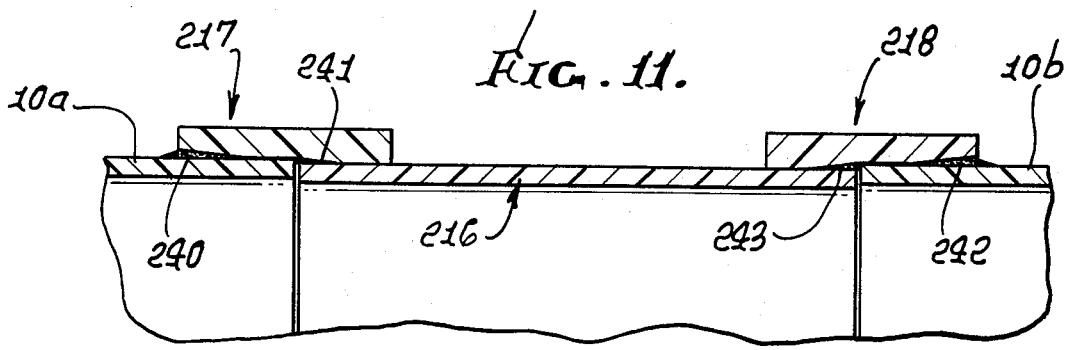

PIPE COUPLING

This application is a continuation-in-part of my copending application Ser. No. 524,248, filed Aug. 18, 1983 and now abandoned.

BACKGROUND OF THE INVENTION

This invention relates generally to pipe couplings, and more specifically to couplings characterized as speeding the repair of underground piping systems as commonly used in the irrigation of avocado and citrus groves.

Such systems generally comprise a number of twenty-foot lengths of plastic pipe extending horizontally in rows, which are usually spaced about twenty feet apart. The lengths of pipe in each row are usually connected to each other by a pipe tee, to which is attached a vertical length of pipe commonly called a riser. The horizontal rows of pipe are usually buried twelve to eighteen inches below the ground surface with the vertical length of pipe or riser extending some distance above the ground. A sprinkler head is attached to the upper end of the riser and serves to distribute water around an adjacent tree.

Citrus and avocado groves usually have about ninety trees per acre of ground, and since each tree has its own sprinkler, it is clear that each grove acre would have at least about 1800 feet of underground piping. Also, since the lengths of pipe are connected by a pipe tee, there are approximately 270 glued, or cemented, underground connections per acre. This type of underground irrigation system, over a period of time, is subject to damage of various kinds which must be repaired.

Probably the most common damage is caused by roots of trees in the grove. As such trees mature, their roots become quite massive and they often press against the underground pipes with sufficient force to crack or break them. Heavy rains occasionally cause earth movement which can cause stresses in the piping sufficient to cause some of the glued connections to loosen and leak and therefore necessitate repair. Also, grove workers, grove machinery and even burrowing animals may occasionally damage the underground piping.

The repair of underground piping in a grove is made particularly difficult by the tree roots, many of which must be severed before the damaged pipe section can be replaced. Heretofore, it has been necessary to uncover many feet of pipe on each side of the damaged section to provide sufficient pipe flexibility to permit re-connection of the pipe ends after the damaged section had been repaired. The excavation of a trench of sufficient length to permit pipe upward flexing for repair was difficult, time consuming, and expensive in terms of labor cost.

It should be pointed out that the flexing of the pipe and insertion of the pipe end into the standard pipe collar for re-connection had to be accomplished within a few seconds after the glue or cement had been applied to the pipe end. Otherwise, the pipe end would not enter the coupling, as commercial grades of plastic pipe cement are quick setting compounds. Consequently, the re-connecting manuever was never easy.

SUMMARY OF THE INVENTION

It is a major object of the invention to provide a pipe coupling which is easily installed, and which removes the necessity for making an extensive excavation (i.e. "trenching") as described above; therefore, damage to tree roots is minimized. Also, the invention obviates the prior need to flex the pipe upwardly for final, re-connection, or insertion of the pipe end into the pipe collar, since the improved coupling can be installed at pipe sub-surface level.

Basically, the invention is embodied in an improved coupling or coupling system for joining two pipe lengths or sections having elongated outer surface and end terminals, and comprises:

(a) a tubular extension fitted endwise between the pipe terminals to form joints therewith, (b) first and second collars telescopically movable axially of the tubular extension into coupling positions spanning the respective joints, (c) one collar having an axially elongated bore and counterbore, one of which has elongated slidable engagement with the outer surface of one end of the extension, and the other of which has elongated slidable engagement with the elongated outer surface of one pipe section, (d) the other collar having an axially elongated bore and counterbore, one of which has elongated slidable engagement with the outer surface of the other end of the extension, and the other of which has elongated slidable engagement with the elongated outer surface of the other pipe section, (e) and liquid bonding agent between the collar and said pipe sections and said extension to bond the collars to the extension and to the pipe sections, for sealing off therebetween.

As will appear, the tubular extension (which may consist of synthetic resin) typically may have an outer diameter which differs from the outer diameters of the pipe sections to be joined, whereby stop shoulders on the collars may engage against the ends of the extension or pipe section terminals, thereby to establish the above mentioned coupling and sealing positions of the collars with the extension and pipe ends. The sealing of the parts being effected by the liquid bonding agent after it has cured. In addition, the collar bores may be annular whereby the liquid bonding agent is distributed annularly about the tubular extension and pipe terminals as the collars are shifted axially to their coupling positions. The stop shoulders referred to may be formed between coupling bores and counterbores, and may be axially tapered, to form third bores, and fourth bores, as will appear.

While the advantages of the invention are significant in the repair of the underground piping, it should be understood that the invention may be advantageously employed for connecting two lengths of plastic pipe wherever conditions are such that longitudinal movement of the pipes is difficult or impossible.

These and other objects and advantages of the invention, as well as the details of an illustrative embodiment, will be more fully understood from the following specification and drawings, in which:

DRAWING DESCRIPTION

FIG. 1 is an elevation showing a current method of pipe repair;

FIG. 2 is a section, in elevation, showing a coupling embodying the invention, and during installation;

FIG. 3 is a fragmentary section, in elevation showing the FIG. 3 coupling upon completion of installation;

FIGS. 8–11 are sections showing relative positions of different elements of further modified couplings during their installation on pipe section ends and a tubular extension.

DETAILED DESCRIPTION

Figure 4:
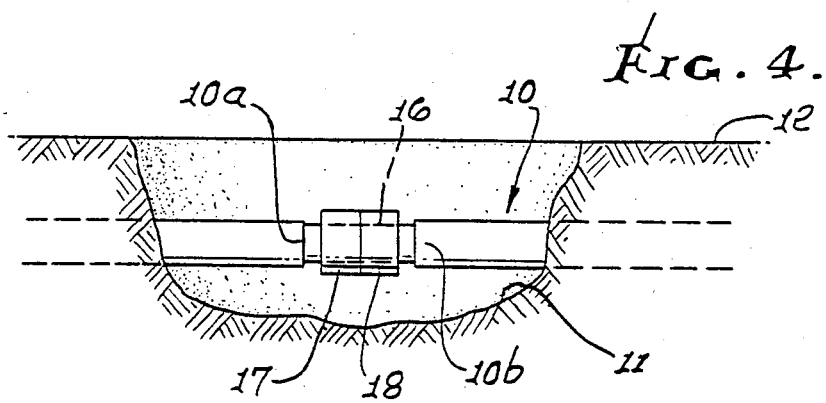
FIG. 4 is a view like FIG. 1, showing the coupling of FIGS. 2 and 3 during the FIG. 2 stage of installation, underground.

FIG. 1 shows the present method of repairing underground plastic pipe 10. An excavation in the form of an elongated trench 11 is formed below ground level 12 so that the plastic pipe can be pulled upwardly as shown. The old pipe has been severed as during removal of a damaged section, and standard pipe collars 13 have been fitted over the severed ends and cemented in place. A length 90 of new pipe, carefully measured to provide sufficient length to be overlapped by pipe collars 13, has one end cemented to one of the collars. Cement is then applied to the other end and all of the pipe in the trench is raised upward and flexed sufficiently to permit the freshly cemented pipe end to enter the end of collar 13. As the pipe is straightened, the end of the new pipe is thrust further into coupling 13 and the required amount of overlap is thus obtained. Note roots 14 which have to be severed to allow upward bending of the pipe. Note also the riser pipe 15, and tee 16'.

The improved coupling or coupling system of the invention is shown in one preferred form in FIG. 2. It comprises a tubular extension 16 adapted to be fitted endwise between the pipe terminals 10a and 10b to form joints therewith as at 20 and 21, slight gaps being permissible. As shown in FIG. 4, this can be done while the terminals 10a and 10b remain in position in the trench 11, the necessary excavation being much shorter than that shown in FIG. 1. It should be noted that extension 16 may be as short as a few inches or as long as several feet or any length desired.

First and second collars are telescopically movable axially of the tubular extension into coupling positions spanning the respective joints 20 and 21. See for example the collars 17 and 18 which are movable axially from FIG. 2 initial positions about the tubular extension to the coupling positions as appear in FIG. 3. The collars 17 and 18 and extension 16 may also consist of synthetic resin (i.e. plastic material). Examples are polyvinyl chloride and polyethylene, others being usable.

The collars have bores 17a and 18a to slidably interfit the outer cylindrical surface of the tubular extension, and counterbores 17b and 18b. The latter are spaced from the extension surface, and form recesses 22 and 23 located to face the outer surface of the extension 16, for reception of liquid bonding agent or cement to bond the collars to the extension 16, and to the pipe lengths, for forming a rigid assembly and to seal off between these elements. Thus, for example, an annular band or coating of bonding agent may be applied to the annular extension surface 16 and pipe end 10b as at 24 to be enveloped by the recess 23 and to be received in the slight clearance between bore 18a and the extension surface, and in the slight clearance between counterbore 18b and the surface of pipe terminal 10b, in FIG. 3. Note that elongated counterbore 18b has close slidable fit with the elongated bore 18a has close slidable fit with the elongated surface of extension 16. Likewise, elongated counterbore 17b has close slidable fit with the elongated surface of pipe terminal 10a, in FIG. 3; elongated bore 17a has close slidable fit with the elongated surface of the extension 16; and liquid bonding agent received in recess 22 is carried into the slight clearances adjacent the bore 17a and counterbore 17b, in FIG. 3, for bonding the collar 17 to the pipe terminal 10a and to the extension 16.

When the elements are constructed as described and shown in FIG. 2 the cement or glue is not wiped off the extension end when the collar is moved outward and over the pipe end.

It will be seen that stop shoulders 25 and 26 are formed between the bores and counterbores referred to. In coupling position of collar 17, the shoulder 25 is engaged against the end 27 of the pipe section 10a, the outer diameter of which exceeds slightly the outer diameter of the extension. Likewise, in coupling position of collar 18, the stop shoulder 26 is engageable against the end 28 of the pipe section 10b, the outer diameter of which exceeds slightly the outer diameter of the extension. Such engagement limits sliding of the collars at predetermined coupling positions thereof, whereby a relatively rigid assembly is made up in bond-curing positioned of the components. Only two collars and one extension are required to interfit the two elongated pipe sections making a total of five elements.

Figure 5:
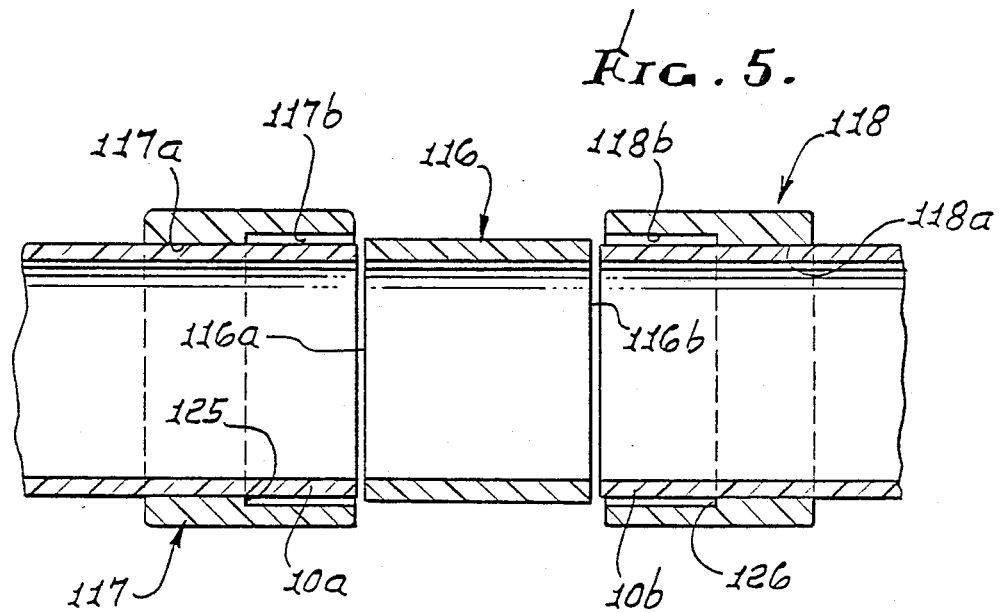
FIG. 5 is a view like FIG. 2, showing a modified coupling.
Figure 6:
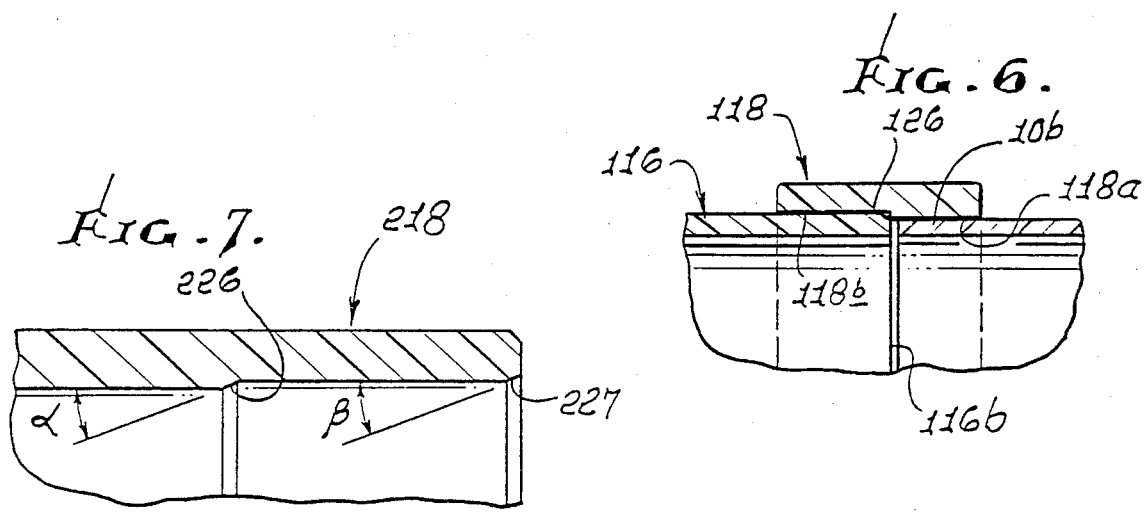
FIG. 6 is a fragmentary section, in elevation, showing a portion of the FIG. 5 coupling, upon completion of installation.

The modification of FIGS. 5 and 6 is similar to that of FIGS. 2 and 3; however, the collars 117 and 118 are slidable toward one another from initial position on the pipe terminals to coupling positions overlapping the extension 116, as seen in FIG. 6. Stop shoulders 125 and 126 are formed by bore 117a and counterbore 117b, and by bore 118a and counterbore 118b. In coupling position of collar 117, the shoulder 125 is engaged against the end 116a of the extension 116, the outer diameter of which slightly exceeds the outer diameter of the pipe section 10a. Likewise, in coupling position of collar 118, the stop shoulder 126 is engaged against the end 116b of the extension 116, the outer diameter of which slightly exceeds the outer diameter of pipe section 10b.

Likewise, when the elements are constructed as described in FIG. 5 the cement or glue is not wiped off the pipe ends when the collar is moved inward and over the extension end.

The stepped internal diameter of the collar provides another desirable feature described as follows:

Commercial grades of pipe cement are quick setting, and after one pipe end, and the adjacent end of the extension have been coated with cement, the collar must be quickly thrust outward and over the pipe end to its final position. There is little or no time for careful positioning of the collar because the cement will quickly set up and the collar will become stuck to the extension. However, the stepped internal diameter of the collar provides a pre-determined shoulder or stop which assures the right amount of overlap between the parts when the collar is thrust forcefully outward over the end of the pipe.

Another desirable feature of the invention is the ease with which the coupling can be aligned for attachment to the pipe ends. This is accomplished by moving one collar into overlapping position with an un-cemented pipe end to thereby align and hold the opposite end of the extension in close alignment with the other pipe end. This greatly facilitates the application of cement to the extension end, and the adjacent pipe end, since both can then be coated with the cement simultaneously.

As stated above, a highly desirable feature of the invention is its ability to join and seal two rigid pipe members which, for one reason or another, cannot be moved from their fixed positions.

Figure 7:
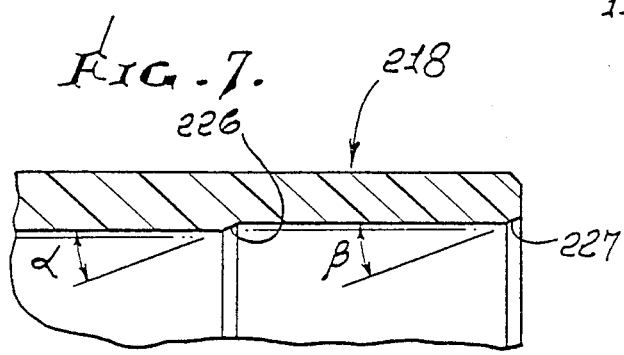
FIG. 7 is a fragmentary section showing a modified collar.

FIG. 7 shows a modified collar 218, otherwise corresponding to collar 18. The stop shoulder 226 (corresponding to shoulder 26) is tapered inwardly at an angle α. Likewise, the counterbore end of the collar is tapered at 227 at one angle β. Angles α and β are typically about 20°, or in some instances less than 20°. These tapers avoid sharp leading edges which might tend to scrape off some of the pipe cement when the collar is moved axially. All the collars may have this construction.

FIGS. 8–11 show various stages in the make up of further modified plastic collars 217 and 218 with respect to plastic pipe section 216 fitted between plastic pipe ends or terminals 10a and 10b. FIG. 8 shows an initial condition, wherein the collars 217 and 218 are everywhere on the extension 216 fitted axially between the ends of pipe sections 10a and 10b which have elongated outer surfaces. The latter may be slightly larger in diameter than the tubular extension outer diameters, as shown.

In this regard, it will be noted that each collar has four bores. For example, collar 217 has a first axially extending bore 217a which closely fits and is slidable upon and along the extension outer surface 216a; and a second axially extending bore 217b which closely fits and is slidable upon and along the elongated outer cylindrical surface of the pipe section 10a (see FIG. 9) for holding the extension and pipe section 10a in axial alignment. In addition, the coupling 217 has a third bore 217c located between the first and second bores and which is diametrically slightly larger than the first bore 217a, and slightly smaller than the second bore 217b whereby a predetermined clearance is provided between the extension surface and the collar for reception of liquid cement for bonding the collar to the extension 216, and a fourth bore 217d diametrically slightly larger than the second bore; whereby a predetermined clearances is provided between the pipe section surface and the collar for reception of liquid cement for bonding the collar to the pipe end 10a. Such liquid cement is indicated at 240 and 241 in FIG. 11. In similar manner, the like coupling 218 has first, second, third and fourth bores 218a–218d, having the same relations to extension 216 and pipe section 10b. See also liquid cement at 242 and 243 in FIG. 11. Such cement, when cured, defines positive annular seals in such clearances. Note further that the third and fourth bores 217c, 217d, 218c and 218d, are preferably tapered, as shown, but may have other configurations.

In FIG. 9, collar 217 has been slid or advanced leftwardly over the surfaces of extension 216 and pipe section 10a to align extension end 216b with pipe end 10b so that liquid cement can be applied simultaneously thereto as shown at 242 and 243. Note that no liquid cement is applied to pipe end 10a and extension end 216a at this time. Immediately after liquid cement has been applied to pipe end 10b and extension end 216b the collar 218 is thrust firmly to the right to its final position as shown in FIG. 11. FIG. 10 shows how the liquid cement is displaced into the predetermined clearances as the collar advances, whereby tapered bore 218c pressurally funnels the liquid cement on the extension surface into the clearances between cylindrical bore 218a and the extension, and pushes liquid cement rightwardly into the clearance between bore 218b and the surface of pipe section 10b; also tapered bore 218d funnels liquid cement on the surface of the pipe section into the clearance between the cylindrical bore 218b and the pipe section outer surface. Therefore, a completely sealed joint is developed with annular, wedge-shaped seals remaining in chambers inwardly of bores 218c and 218d. Note that bore 218a remains axially spaced from the end of the extension end. The same occurs with respect to sealing of collar 217 to the extension 216 and pipe section 10a, as represented in FIG. 11. Also, the collars axially align the extension and the pipe sections. With collar 218 cemented in place as shown in FIG. 11, collar 217 may be moved to the right so that liquid cement can be applied simultaneously to the surfaces of pipe end 10a and extension end 216a. Immediately thereafter collar 217 is thrust firmly to the left to the position shown in FIG. 11.

Important features of the coupling include close fitting between the collar and pipe section and pipe extension ends to provide positive alignment of the coupling parts together with predetermined annular clearances for reception of liquid cement; and the fact that close fitting bores 217a and 218a never reach the ends 216a and 216b of the extension 216 (due to the fact that tapered bores 217c and 218c engage the ends of the slightly larger outer diameter pipe sections 10a and 10b) whereby the cement cannot be completely wiped from the cylindrical outer end surfaces of the extension 216.

In the FIG. 10 second position of collar 218, the end of the pipe section 10b blocks the open end of the annular channel formed between cylindrical bore 218b and the outer surface of extension 216. FIG. 11 shows the third and final position of collar 218, with liquid cement extending between the interfitting parts, and seals established at 242 and 243.

It should be noted that solvent type, liquid cement when applied to the exterior surfaces of PVC pipe, tends to spread or run until only a relatively thin coating, usually about 0.010" to 0.020" thick adheres to the pipe. This thin coating dries very quickly and unless the close fitting coated parts are moved to their final position very quickly, in fact within a very few seconds, it may be impossible to move them to the desired final position. Applicant's structure is conducive to rapid final positioning of the coated parts.

The present coupling of FIGS. 8–11 solves the known problem of surface to surface contact on one side of the mating parts and excessive clearance on the other side which can result in glue starved areas which may result in immediate leakage or later leakage when the joint is subjected to internal pressure. This problem is solved in applicant's structure by means for closely aligning the interfitting parts of the coupling and then providing means for creating a predetermined controlled clearance between the interfitting parts for reception of the liquid bonding agent for fastening and sealing the parts together. This is accomplished with a minimum number of easily manufactured tubular parts. The structure of U.S. Pat. No. 3,971,574 to Curtin is believed incapable of solving the above mentioned problem.

One commercial cement which may be used is identified as Weld-On #710 Plastic Pipe Cement, made by Industrial Polychemical Service, Box 471, Gardena, Calif. 90247.

I claim:

1. In a coupling for joining and sealing two pipe sections having elongated outer surfaces and end terminals, the combination with said pipe sections comprising
   (a) an extension comprising a length of tubing substantially bridging the space between the pipe terminals to form joints therewith,
   (b) twin collars telescopically movable axially of the extension into coupling positions spanning the respective joints,
   (c) each collar having a first aligning bore sized for close slidable engagement with the outer end surface of the extension and a second aligning bore sized for close slidable engagement with the outer end surface of said pipe section and when in said coupling position holding said pipe section and extension ends in close axial alignment,
   (d) said first aligning bore having an axially extending first counterbore providing a predetermined annular space between said collar and the extension and said second aligning bore having an axially extending second counterbore providing a predetermined annular space between said collar and said pipe end when in said coupling position,
   (e) and a liquid bonding agent in both said spaces and bonding said collar to the extension and pipe end and sealing therebetween,
   (f) one of said counterbores extending between said first and second aligning bores.

2. The combination of claim 1 wherein said extension consists of synthetic resin and is sized to have an outer diameter differing from the outer diameters of the pipe sections.

3. The combination of claim 2 wherein said collars consist of synthetic resin.

4. The combination of claim 1 wherein said collar bores and counterbores are annular.

5. The combination of claim 1 wherein the extension outer diameter is uniform along its length and is less than the outer diameters of the pipe sections.

6. The combination of claim 1 wherein the extension outer diameter is uniform along its length, and is greater than the outer diameter of the pipe section.

7. The combination of claim 1 wherein said first counterbores are tapered in directions away from the pipe ends with which they are engaged.

8. The combination of claim 1 wherein said first and second counterbores taper gradually radially outward from said first and second aligning bores, respectively.

9. In a coupling for joining and sealing two pipe sections having elongated outer surfaces and end terminals, the combination with said pipe sections comprising
   (a) an extension comprising a length of tubing substantially bridging the space between the pipe terminals to form joints therewith,
   (b) twin collars telescopically movable axially of the extension into coupling positions spanning the respective joints,
   (c) each collar having a first aligning bore sized for close slidable engagement with the outer end surface of the extension and a second aligning bore sized for close slidable engagement with the outer end surface of said pipe section and when in said coupling position holding said pipe section and extension ends in close axial alignment,
   (d) said first aligning bore having an axially extending first counterbore providing a predetermined annular space between said collar and the extension and said second aligning bore having an axially extending second counterbore providing a predetermined annular space between said collar and said pipe end when in said coupling position,
   (e) and a liquid bonding agent in both said spaces and bonding said collar to the extension and pipe end and sealing therebetween.

* * * * *